No. 740,887. PATENTED OCT. 6, 1903.
P. MAURICE.
APPARATUS FOR WASHING SAND, GRAVEL, AURIFEROUS ALLUVIA, OR THE LIKE.
APPLICATION FILED NOV. 25, 1902.
NO MODEL. 5 SHEETS—SHEET 1.
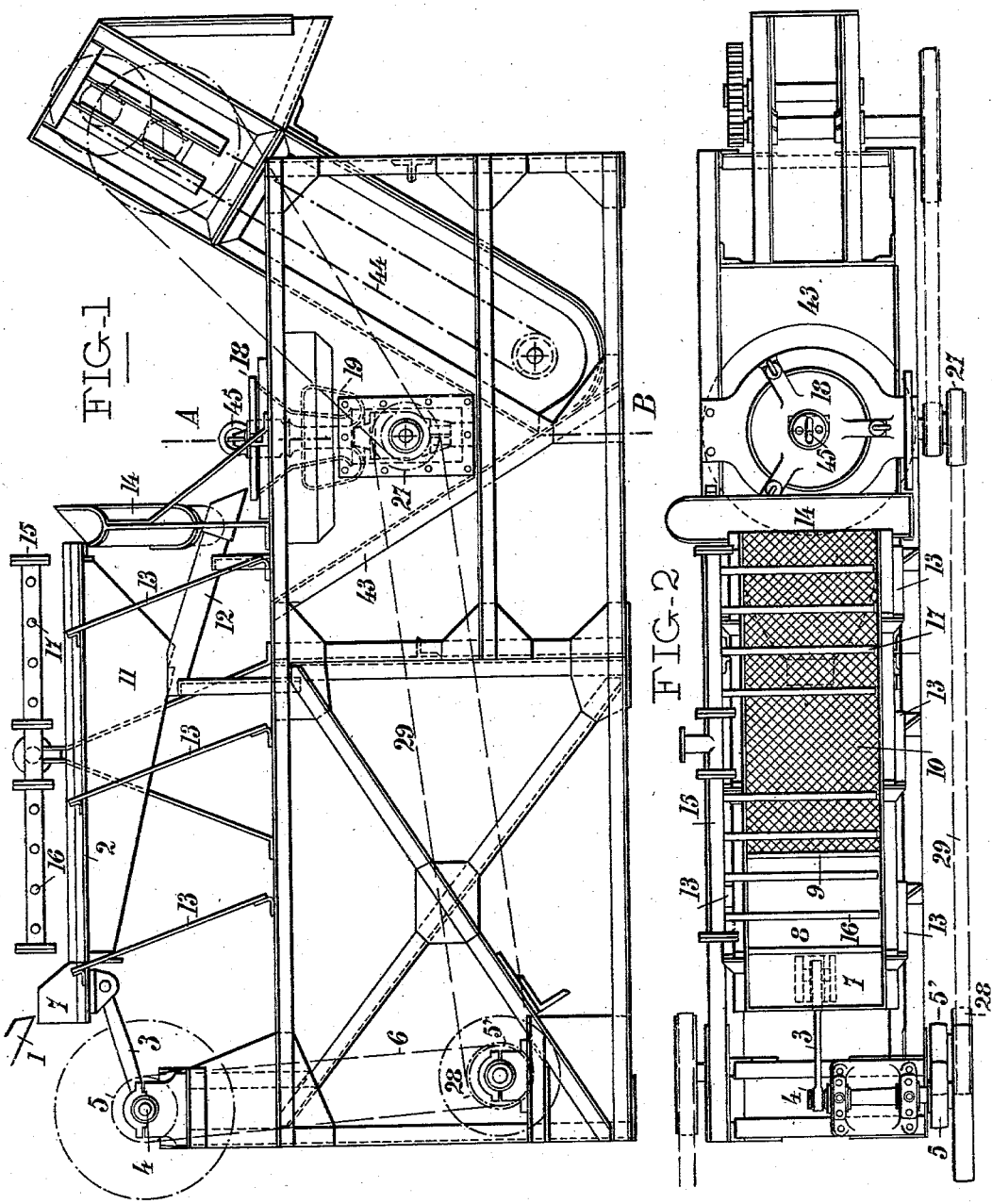
Witnesses
Jean Germain
Guillaume Pioche
Inventor
Paul Maurice
By Wiedersheim & Fairbanks
Attorneys

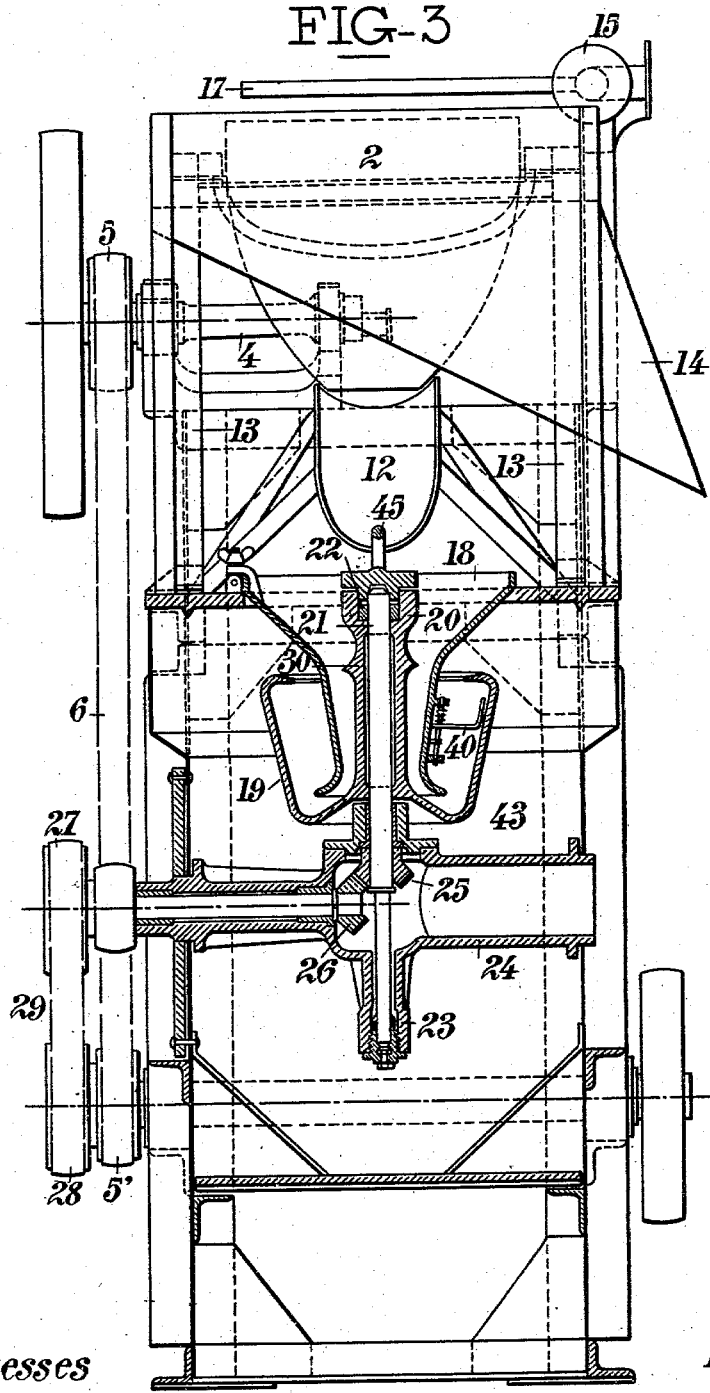

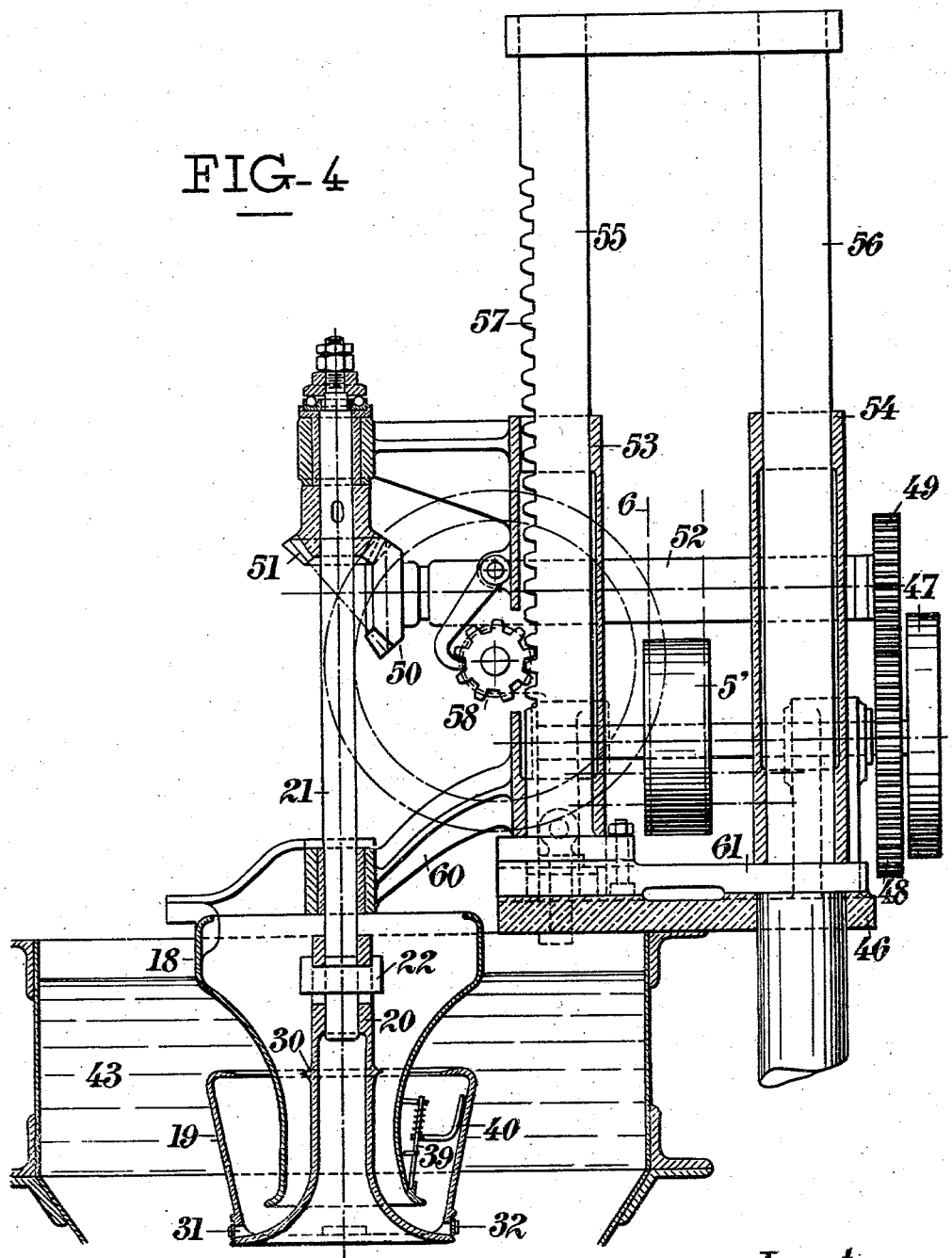

No. 740,887. PATENTED OCT. 6, 1903.
P. MAURICE.
APPARATUS FOR WASHING SAND, GRAVEL, AURIFEROUS ALLUVIA, OR THE LIKE.
APPLICATION FILED NOV. 25, 1902.
NO MODEL. 5 SHEETS—SHEET 4.

Witnesses
Jean Germain
Guillaume Pioche

Inventor
Paul Maurice
By Wiedersheim & Fairbanks
Attorneys.

No. 740,887. PATENTED OCT. 6, 1903.
P. MAURICE.
APPARATUS FOR WASHING SAND, GRAVEL, AURIFEROUS ALLUVIA, OR THE LIKE.
APPLICATION FILED NOV. 25, 1902.
NO MODEL. 5 SHEETS—SHEET 5.

Witnesses
Jean Germain
Guillaume Pioche

Inventor
Paul Maurice
By Niedersheim & Fairbanks
Attorneys.

No. 740,887. Patented October 6, 1903.

UNITED STATES PATENT OFFICE.

PAUL MAURICE, OF ST. ETIENNE, FRANCE, ASSIGNOR OF ONE-HALF TO LA SOCIÉTÉ NOUVELLES DES ETABLISSEMENTS DE L'HORME ET DE LA BUIRE, OF LYONS, FRANCE.

APPARATUS FOR WASHING SAND, GRAVEL, AURIFEROUS ALLUVIA, OR THE LIKE.

SPECIFICATION forming part of Letters Patent No. 740,887, dated October 6, 1903.

Application filed November 25, 1902. Serial No. 132,722. (No model.)

*To all whom it may concern:*

Be it known that I, PAUL MAURICE, engineer, a citizen of the Republic of France, residing at 8 Rue Buisson, St. Etienne, département de la Loire, in the Republic of France, have invented certain new and useful Improvements Relating to Apparatus for Washing Sand, Gravel, Auriferous Alluvia, or the Like, of which the following is a specification.

This invention has for its object the necessary improvements for the adaptation to the special treatment of sand, gravel, auriferous alluvia, and the like of the centrifugal washing apparatus patented by Paul Maurice October 17, 1899, No. 634,987.

In order that the present invention may be readily understood and carried into effect, I will describe the same fully with reference to the accompanying drawings, which represent two forms of apparatus for washing auriferous alluvia for the purpose of eliminating nearly all the waste or useless matters and to concentrate the precious material into a very small volume.

Figure 5:
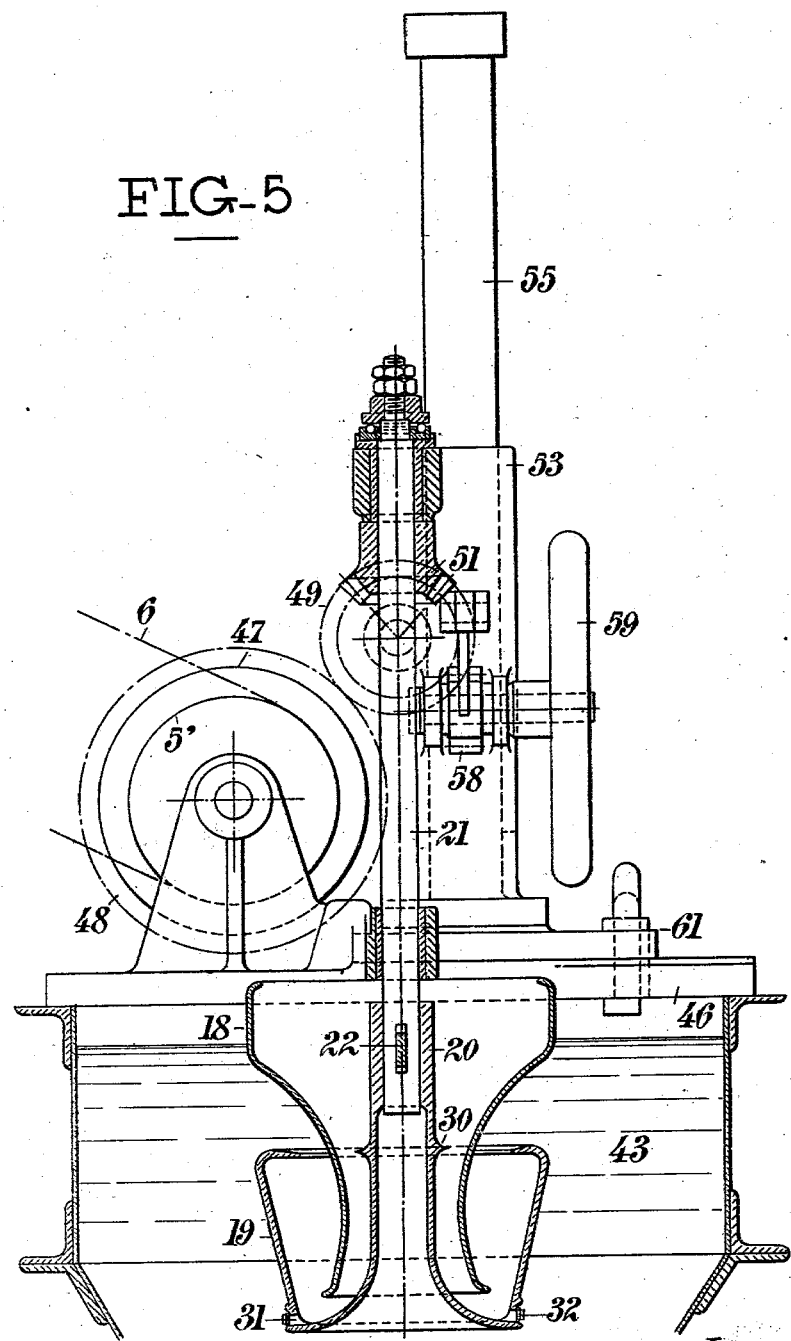
Figure 6:
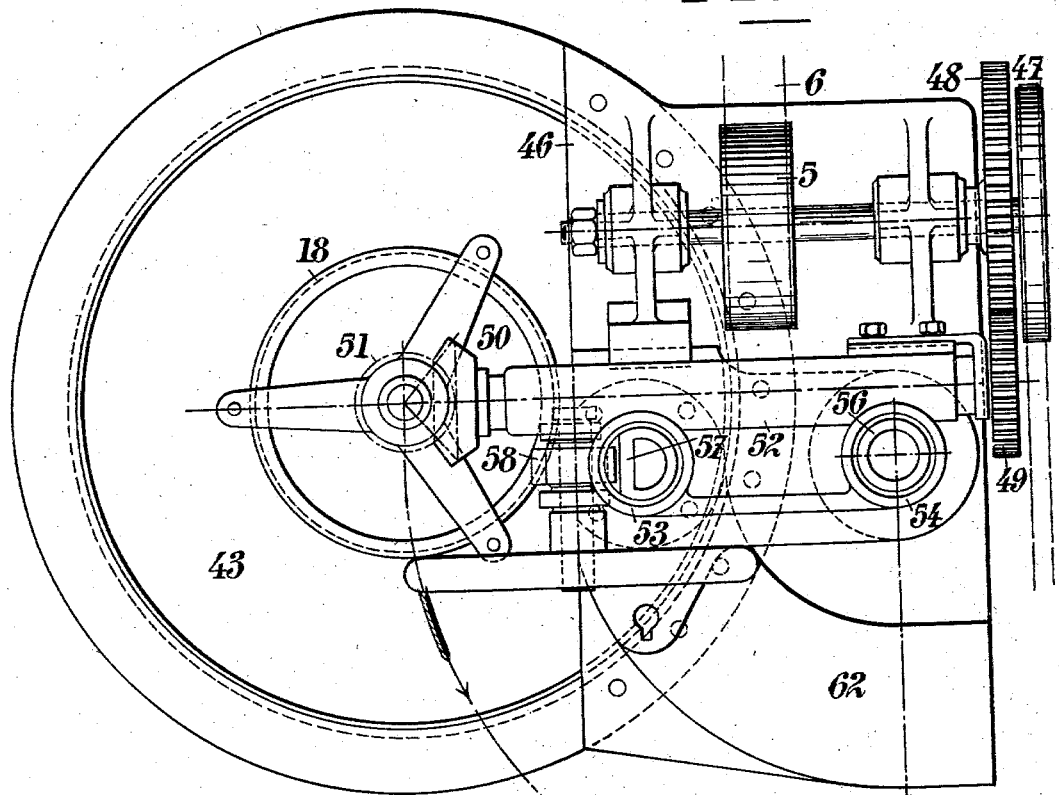
Figures 7, 8:
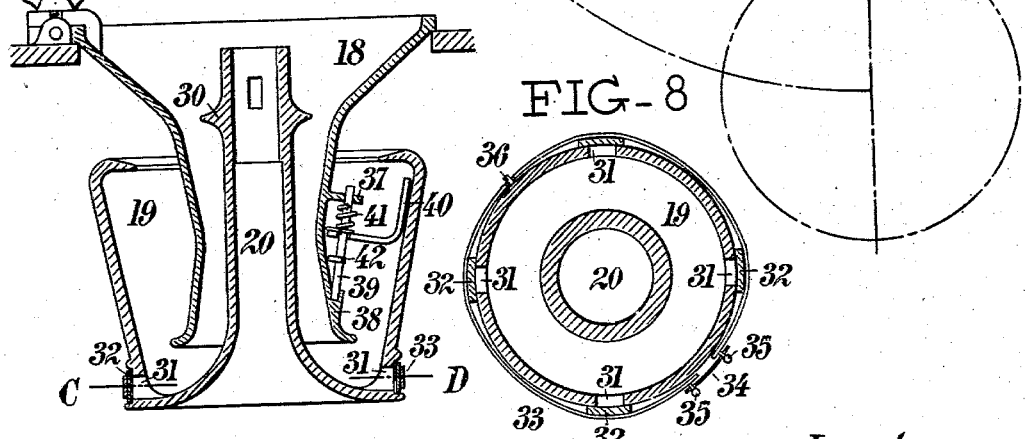

Figures 1 and 2 represent, respectively, in elevation and plan the first arrangement of washing device. Fig. 3 is a section, on an enlarged scale, taken on the line A B of Fig. 1. Figs. 4, 5, and 6 represent, respectively, in central section, side view, (part sectioned,) and plan the second modification of washing device. Fig. 7 is a central section, on an enlarged scale, of the washing vessel and of the distributing-funnel; and Fig. 8 is a horizontal section taken on line C D of Fig. 7.

The materials to be treated are conducted by a strainer or an automatic distributer 1 onto an oscillating table 2, which receives motion by a connecting-rod 3, operated by an eccentric on an axis 4. This latter receives motion by means of a pulley 5 and a belt 6, connected with the source of power by the pulley 5' and belt 29.

The oscillating table 2 comprises a receiver 7, closed at the back and into which the material falls from the strainer 1. The bottom of said receptacle 7 is horizontal and is prolonged by a plain flat plate 8, terminated by a projection 9, of suitable height, occupying the breadth of the table, this flat plate constituting the principal part of the table, properly speaking. The flat table is continued by a grating 10, of wire-gauze, either fixed to the casing or movable, which is extended to the opposite extremity. The materials which traverse the wire-gauze are received into a hopper 11, forming one piece with the oscillating table, which discharges them into a fixed funnel 12, by which they are directed into the washer, properly speaking. The extremity of this funnel or hopper is removable for facilitating the working.

The oscillating table 2 is carried by springs 13. It has for its object to make a first classification and to reject the too voluminous elements. These materials are thrown back by a hopper or funnel 14, while the finer materials traverse the sieve and pass into the washer. A conduit 15, with transverse inclined perforations 16 and 17, continually pours jets of water on the two parts of the oscillating table.

The washer, properly speaking, is composed of a funnel 18 and a centrifugal vessel 19, curved inwardly at its upper part for the purpose of preventing the precious materials from escaping. The centrifugal vessel carries at its center a hollow cylinder 20, in which is engaged the motor-shaft 21, to which it is rigidly fixed by means of a key 22. This shaft 21 turns at its lower portion in a bearing 23, carried by a support 24, fixed to the framework of the apparatus, and it receives its movement by means of bevel gear-wheels 25 and 26 and by pulleys 27 and 28, connected by a strap 29. The cylinder 20 is provided with a boss 30 in the form of an annular enlargement, which restricts the opening or passage into the vessel 19. This latter may be either solid at its lower part, Fig. 3, or pierced with four openings 31, Figs. 4, 5, 7, and 8, designed to empty the treated materials. In this latter case these openings are closed by leather plugs 32, carried by a steel plate 33, forming a spring, and whose extremities are united by a plate 34, provided with two openings in which engage buttons 35, carried on the plate.

To facilitate the putting in place of the plugs, the plate 33 is pierced at its middle with an opening engaging with a hook 36, arranged on the exterior of the washing-table. When the apparatus is put in motion, the centrifugal force tends to separate the plate 33 in a degree proportionate to the speed of the device.

The funnel 18 is cast with two lugs 37 and 38, Fig. 7, adapted to support a bent metallic rod 39, which a spring 41 causes to press constantly against the interior wall of the table in order to produce a continual agitation of the materials to be treated, which tend to ascend to the upper part of the apparatus. A hook 42, abutting against the funnel, facilitates the putting in place of the agitator. By reason of the rotation imparted to the axis or shaft 21 the materials contained in the vessel 19 are thrown against the tronconical walls of this vessel and tend to raise themselves, following the greatest diameter, while the water and the waste or useless sands and other material are thrown back to the upper part of the vessel and escape therefrom into a reservoir 43, where they are raised by means of a Persian wheel 44 or other convenient device. When there is plenty of water, the materials can be evacuated directly by means of an appropriate outlet.

When the operation is finished, the mechanism is stopped, and in cases where the apparatus is provided with a plain table of the type represented in Fig. 3 the key 22 is disengaged and the vessel 19, raised by hand or by means of a hook and tackle, engaged in the ring or analogous device 45, and the precious materials are taken out by any appropriate means. In large apparatus, where one can use the vessel provided with openings at its lower part, the emptying is effected by means of the arrangement represented in Figs. 4, 5, and 6. This arrangement consists of mounting above water-reservoir 43 a supporting-plate 46, on which is fixed the system of control, consisting of a pulley 47, receiving its movement from the pulley's motive power and on the axis of which is mounted a toothed wheel 48, engaging with a pinion 49, whose axis carries at its other extremity a bevel gear-wheel 50, meshing with a bevel-wheel 51, mounted on the axis 21, which causes the vessel 19 to revolve.

The axis 52 of the toothed wheels 49 and 50 is carried by two hollow cylinders 53 and 54, capable of being displaced longitudinally by two columns 55 and 56 by means of an arrangement of a rack 57, on which turns a pinion 58, the said pinion and its fly-wheel being in one piece with the hollow cylinder 53. If desired, this arrangement may be replaced by a screw fulfilling the same object.

The cylinder 53 carries at its lower end a ribbed arm 60, which serves to support the funnel 18. The column 56 traverses with gentle friction the plate 46, and its lower end is designed to move as on a pivot. A plate 61, supported upon said plate 46, carries the column 56, attached thereto in such a manner that said plate 61 and the parts carried thereby can move around the axis of the column 56 as its pivot, so as to assume the position seen in dotted lines in Fig. 6. 62 is a sector forming an exterior projection of the plate 46. In this manner once the washing ceases it will only be necessary to raise the cylinders 53 and 54 and operate the wheel 59 to raise the funnel 18 and the vessel 19 out of the reservoir of water and then to cause the column 55 to pivot around the column 56 to disengage the funnel and the vessel, which will be led outside the "washer." The cylinders may then be made to descend and the vessel 19 will come to rest in its proper position. The cylinder 20 can be disengaged from the shaft 21 by raising the key 22, when a new vessel may be affixed in position. The plate 33, carrying the plugs 32, can be raised, and the emptying will take place automatically into the receptacles, which are arranged for that purpose. The washer may be mounted permanently or on movable trucks with or without a motor.

What I claim, and desire to secure by Letters Patent of the United States, is—

1. In a device of the character described, the combination of a rotative vessel inclined inward at its upper part with an agitator comprising a curved rod stretched by a spring affixed to a funnel depending within said vessel, and means for emptying said vessel.

2. In a device of the character described, a rotative vessel, a shaft therefor, a funnel extending within said vessel, a substantially vertically-disposed rod carried by the funnel, a spring on said rod, a rod mounted on said rod and having a portion parallel with the walls of the vessel, a spring around the first-mentioned rod and acting on the last-mentioned rod to urge it constantly against the interior wall of said vessel.

3. In a device of the character described, the combination with a rotative vessel, of a funnel extending downward therein, an agitator comprising a curved rod and a spring acting thereon and affixed to the funnel and depending within said vessel, said vessel having a cylindrical portion to receive its shaft, and arranged coaxially within the funnel, and a boss on said cylindrical portion within the funnel.

4. In a device of the character described, the combination with a rotative vessel, of a funnel extending downward therein, said vessel having a cylindrical portion to receive its shaft, and arranged coaxially within the funnel, a boss on said cylindrical portion within the funnel, and an agitator carried by the funnel and comprising a curved rod stretched by a spring affixed to the funnel and disposed for coöperation with the inner wall of said vessel.

5. In a device of the character described, a rotative vessel having outlets, closures for said outlets and a spring-band encircling said vessel and carrying said closures, and means for adjustably and detachably connecting the ends of said band.

6. In a device of the character described, a rotative vessel having outlets, closures for said outlets and a spring-band encircling said vessel and carrying said closures, and means for adjustably and detachably connecting the ends of said band, and a hook carried by said vessel to engage an opening in said band.

7. In a device of the character described, a vessel provided with openings at its lower portion, a base, two columns fixed thereto, one being mounted to turn as upon a pivot and to serve as an axis of rotation for both, a pair of hollow cylinders mounted for vertical movement upon said columns, a vessel, and a funnel for coöperation therewith.

In testimony whereof I have hereunto set my hand, in presence of two subscribing witnesses, this 10th day of November, 1902.

PAUL MAURICE.

Witnesses:
JEAN GERMAIN,
GUILLAUME PIOCHE.